June 24, 1930. J. W. BAUER 1,766,094
PLANT SUPPORTING CLIP
Filed March 16, 1929
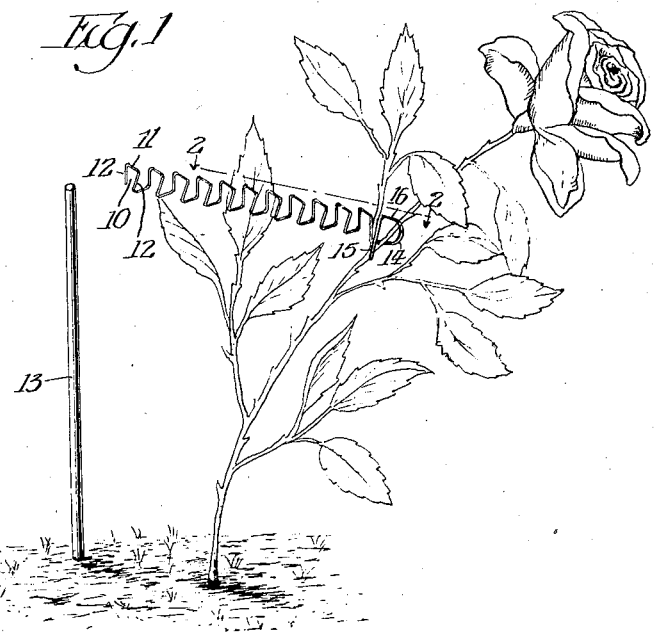
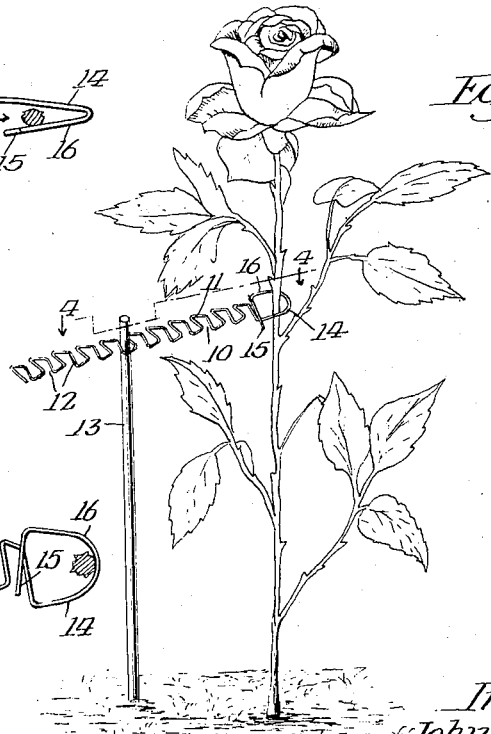
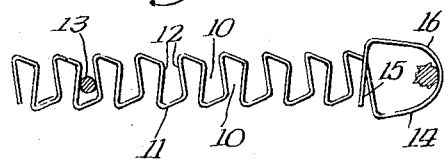
Inventor:
John W. Bauer
By [signature] Atty.

Patented June 24, 1930

1,766,094

UNITED STATES PATENT OFFICE

JOHN W. BAUER, OF NAPERVILLE, ILLINOIS

PLANT-SUPPORTING CLIP

Application filed March 16, 1929. Serial No. 347,509.

This invention relates to improvements in plant supporting clips adapted to secure a plant stem to a supporting stake or wire, whereby the plant will be held up and prevented from drooping or falling, and one of the objects of the invention is to provide an improved clip of this character which will not only be light and durable, but will be of a simple construction and effective and efficient in operation, readily applicable and detachable when desired, and which will not injure the plant and at the same time will not interfere with the swaying of the plant by wind or otherwise.

Heretofore it has been necessary to provide clips of different sizes to meet different conditions and adapt them to different plants to hold the plants in the proper position with respect to the stake. It is another object of the present invention to provide an improved clip which is adapted to be manipulated and attached to the plant and stake by one hand of the operator and without necessitating the operator grasping or holding the plant, and which clip is adapted to be secured to the stake at any desired point throughout the length of the clip and from either side of the clip, and when secured to the stake will be held against slipping down upon the stake.

A further object is to provide an improved clip of this character having means for securely fastening or locking the plant stem against displacement therefrom when the plant is vibrated.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a perspective view of a clip constructed in accordance with the principles of this invention showing the same as applied to a plant and before the clip is drawn towards the plant and the clip secured to the stake.

Figure 2 is a view taken on line 2—2, Figure 1.

Figure 3 is a view showing the clip secured to the stake for holding the plant upright.

Figure 4 is a view taken on line 4—4, Figure 3.

In carrying out this invention, the clip is formed from a single piece of pliable and resilient material such as metal preferably in the form of wire bent back and forth upon itself to form recesses 10 alternately opening through opposite sides of the clip, the body of the clip being of any desired length and any desired number of recesses 10 may be provided.

The bottom 11 of each of the recesses is inclined to the longitudinal axis of the clip and the side walls 12 of each of the recesses converge from the bottom 11 toward the open end thereof, but terminate short of each other to form restricted inlet openings for the recesses.

The walls 12 together with the bottom 11 of the recesses being so shaped cause the walls 12 to be resilient so that when the clip is secured to a stake 13 by forcing the clip towards the stake so that the stake will enter one of the recesses. The walls 12 will yield sufficiently to permit the entrance of the stake into the recess and will then frictionally bind the clip to the stake so that when the clip is fastened to a plant and the plant is vibrated, the clip will not slip down upon the stake 13, but will remain in the position to which it has been secured.

Furthermore the clip may be secured to the stake at any point throughout the length of the stake and for rocking movement on the longitudinal axis of the clip while secured to the stake, thereby permitting the proper positioning of the clip to detach a plant stem therefrom without detaching the clip from the stake.

By providing the recesses opening through opposite edges of the clip, it will be manifest that the clip may be secured to the stake 13 from either side of the clip.

The forward end of the body portion is bent to form an enlarged loop 14 and the extremity 15 of the clip adjacent the loop 14 passes over the body portion of the clip so as to form a closed loop at such end, the loop being of a diameter considerably greater than the diameter of the stalk of the plant.

The portion 16 of the loop is deflected with respect to the body portion as shown more clearly in Figure 2, so as to form a hook shaped portion at the end of the clip, the extremity 15 extending for any desired distance over the body of the clip transverse to the longitudinal axis.

With this improved construction and in use, the clip is held in the position shown in Figures 1 and 2, that is with the edge of the clip uppermost and with the extremity 15 of the loop pointing downwardly. In this position the portion 16 will form a hook having an entrance opening 17 so as to adapt the loop or hook shaped portion to be engaged over the stem of the plant, as shown in Figure 1. The clip is then turned upon its longitudinal axis so as to bring the clip into the position shown in Figure 3, and then the clip is drawn backwardly towards the stake, pulling with it the plant until the entrance opening of the desired recess 10 is disposed adjacent the stake 13.

The clip is then forced over the stake causing the stake to enter the recess and during this operation the walls 12 of the recess will yield sufficiently to permit the stake to enter the recess. The walls 12 will then frictionally grip the stake and the plant will be secured in position and firmly to the stake so that during the vibration of the plant caused by wind or otherwise the clip will not become loose with respect to the stake and will not slide down upon the stake, on the contrary will remain secured to the stake at the point at which it was attached. Flexibility of the body of the clip and the size of the opening or loop 14 will permit the plant to yield. The extremity 15 passing over the body portion of the clip forms a closure for the loop 14, thereby rendering it impossible for the plant to become detached from the clip.

To remove the clip all that is necessary is to disengage the body portion thereof from the stake 13 and then twist the clip upon its longitudinal axis to the position shown in Figure 1, after which the end of the clip may be detached from the plant stem by moving the clip forward, causing the plant stem to pass out of the entrance opening 17.

However, the cut plant may be removed from the clip without detaching the latter from the stake, so that the clip may remain attached to the latter in position for use with another growing branch or stem and the clip will be prevented from becoming lost. To accomplish this, the cut stem may either be twisted until it can pass out of the entrance opening of the loop, or the clip itself may be twisted axially without detaching it from the stake, the shape of the stake engaging openings being such as to permit a rocking movement of the clip on the stake when force is employed, but the spring action of the walls of the opening will prevent the clip from so rocking, under normal conditions.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In combination, a relatively rigid upright supporting member, a clip for holding the stem of a growing plant, said clip being formed of a single piece of material shaped to form a loop at one end having an entrance opening for a plant stem thereinto, and means for frictionally securing the clip to said member at different points in the length of the body of the clip and at any point throughout the length of the said supporting member.

2. A clip for holding the stem of a growing plant, said clip being formed of a single piece of material forming a substantially flat body comparatively narrow with respect to its length and shaped to form a loop at one end having an entrance opening for a plant stem thereinto, said opening being substantially parallel to the body of the clip, there being recesses opening through opposite sides of the body portion of the clip beyond the loop.

3. A clip for holding the stem of a growing plant, said clip being formed of a single piece of material forming a substantially flat body comparatively narrow with respect to its length and shaped to form a loop at one end having an entrance opening substantially parallel with the body portion of the clip for a plant stem to pass thereinto, there being recesses opening through opposite sides of the body portion of the clip beyond the loop, said recesses having restricted entrance openings.

4. A clip for holding the stem of a growing plant, said clip being formed of a single piece of material forming a substantially flat body comparatively narrow with respect to its length and shaped to form a loop at one end having an entrance opening substantially parallel with the body portion of the clip for a plant stem to pass thereinto, there being recesses opening through opposite sides of the body portion of the clip beyond the loop, the walls of said recesses being resilient.

5. A clip for holding the stem of a growing plant, said clip being formed of a single piece of material bent back and forth upon itself to form recesses opening through opposite sides of the body thereof and forming a substantially flat body comparatively narrow with respect to its length, and a loop at one end of the body having an entrance opening for a plant stem, the walls of said entrance opening being transverse to the longitudinal axis of the body portion of the clip and disposed in planes substantially parallel with the face of the said body portion.

6. A clip for holding the stem of a growing plant, said clip being formed of a single piece of material bent back and forth upon itself to form a series of adjacent recesses alternately opening in opposite directions, said recesses being spaced in directions lengthwise of the clip the walls of said recesses being resilient and operating to frictionally secure the clip to a supporting member at any point throughout the length of the said member.

7. A clip for holding the stem of a growing plant, said clip being formed of a single piece of material bent back and forth upon itself to form a series of adjacent recesses alternately opening in opposite directions being spaced in directions lengthwise of the clip and said recesses having restricted entrance openings, the walls of said recesses being resilient and operating to frictionally secure the clip to a supporting member at any point through the length of the said member.

8. A clip for holding the stem of a growing plant, said clip being formed of a single piece of material bent back and forth upon itself to form a series of adjacent recesses alternately opening in opposite directions, the side walls of the recesses being resilient and converging from the bottom of the respective recesses towards the entrance thereof, the walls of said recesses operating to frictionally secure the clip to a supporting member at any point throughout the length of said member.

9. A clip for holding the stem of a growing plant, said clip being formed of a single piece of material bent back and forth upon itself to form a series of adjacent recesses alternately opening in opposite directions, the side walls of the recesses being resilient and converging from the bottom of the respective recesses towards the entrance thereof, the bottom of the recesses being inclined with respect to the longitudinal axis of the body portion of the clip, said resilient side walls operating to frictionally secure the clip to a supporting member at any point throughout the length of the member.

10. A clip for holding the stem of a growing plant embodying a body provided with portions throughout its length for frictionally securing the same at any point throughout its length to a stake and at any point throughout the length of the stake the end of the body being bent back upon itself to form a loop, the extremity of the portion forming the loop extending across the adjacent portion of the body and spaced laterally therefrom to form an entrance opening for the loop, said opening extending transverse to the longitudinal axis of the body portion.

11. A clip for holding the stem of a growing plant embodying a body portion having oppositely opening recesses arranged throughout its length, a plant stem engaging loop formed at one end of the body, means forming a closure for the loop to secure the stem and clip against accidental disengagement, and means whereby the loop may be engaged or disengaged from the plant stem by twisting said clip upon the longitudinal axis of its body portion and while the clip remains frictionally attached to a supporting member.

12. A clip for holding the stem of a growing plant embodying a body portion having oppositely opening recesses arranged throughout its length, the walls of said recesses being resiliently yielding to frictionally secure the clip at any point throughout the length of the supporting member, a plant stem engaging loop formed at one end of the body, and means forming a closure for the loop to secure the stem and clip against accidental disengagement.

13. A clip for holding the stem of a growing plant, said clip being formed of a single piece of material bent back and forth upon itself to form a substantially flat body having recesses opening through the opposite sides of the body, the end of the body being bent back upon itself and over one of the faces of the body, the extremity of said bent back portion being deflected across the face of the body transverse to the longitudinal axis thereof and being spaced from and parallel with said face.

14. A clip for holding the stem of a growing plant, said clip being formed of a single piece of material bent back and forth upon itself to form a substantially flat body having recesses opening through the opposite sides of the body, the end of the body being bent back upon itself and over one of the faces of the body, the extremity of said bent back portion being deflected across the face of the body transverse to the longitudinal axis thereof and being spaced from and parallel with said face, the wall of said recesses being resilient for frictionally securing the clip to a supporting member at any point throughout the length of the body of the clip and for rocking movement with respect to said support.

15. A clip for holding the stem of a growing plant, said clip being formed of a single piece of material bent back and forth upon itself to form a substantially flat body having recesses opening through the opposite sides of the body, the end of the body being bent back upon itself and over one of the faces of the body, the extremity of said bent back portion being deflected across the face of the body transverse to the longitudinal axis thereof and being spaced from and parallel with said face, the wall of said recesses being resilient to frictionally secure the clip to said supporting member at any point throughout the length of the body of the clip and at any point throughout the length of the support.

In testimony whereof I have signed my name to this specification, on this 12th day of March, A. D. 1929.

JOHN W. BAUER.